United States Patent
Anschutz

(10) Patent No.: US 10,045,058 B2
(45) Date of Patent: Aug. 7, 2018

(54) METHOD AND APPARATUS TO DELIVER A PERSONALIZED MEDIA EXPERIENCE

(71) Applicant: AT&T Intellectual Property I, LP, Atlanta, GA (US)

(72) Inventor: Thomas Arnold Anschutz, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 14/521,785

(22) Filed: Oct. 23, 2014

(65) Prior Publication Data

US 2016/0119666 A1 Apr. 28, 2016

(51) Int. Cl.
| | |
|---|---|
| H04N 21/262 | (2011.01) |
| H04N 21/482 | (2011.01) |
| H04N 21/858 | (2011.01) |
| H04N 21/2668 | (2011.01) |
| H04N 21/266 | (2011.01) |
| H04N 21/6405 | (2011.01) |
| H04N 21/6408 | (2011.01) |

(Continued)

(52) U.S. Cl.
CPC . *H04N 21/26258* (2013.01); *H04N 21/25891* (2013.01); *H04N 21/2668* (2013.01); *H04N 21/26616* (2013.01); *H04N 21/4825* (2013.01); *H04N 21/6405* (2013.01); *H04N 21/6408* (2013.01); *H04N 21/6543* (2013.01); *H04N 21/8586* (2013.01)

(58) Field of Classification Search
CPC ....... H04N 21/25891; H04N 21/26258; H04N 21/26616; H04N 21/2668; H04N 21/4825; H04N 21/6405; H04N 21/6408; H04N 21/6543; H04N 21/8586
See application file for complete search history.

(56) References Cited

U.S. PATENT DOCUMENTS

| | | | |
|---|---|---|---|
| 7,430,222 B2 | 9/2008 | Green et al. | |
| 7,899,046 B2 | 3/2011 | Ver Steeg | |
| 7,934,230 B2 | 4/2011 | Badt, Jr. et al. | |

(Continued)

OTHER PUBLICATIONS

U.S. Appl. No. 61/973,063, filed Sep. 2015, Lo; Charles Nung.*

*Primary Examiner* — Benjamin R Bruckart
*Assistant Examiner* — Susan X Li
(74) *Attorney, Agent, or Firm* — Guntin & Gust, PLC; Atanu Das

(57) ABSTRACT

Aspects of the subject disclosure may include, for example, a method comprising encoding, by a server comprising a processor, media content to generate a plurality of media content files each having a filename and a uniform resource locator. The method also comprises receiving a channel request from a client media processor and generating a playlist. The playlist is mapped to the requested channel, and includes a filename and uniform resource locator for a personalized content file that is not included in the media content files. The method further comprises receiving a file request from the client media processor in accordance with the playlist, multicasting the plurality of media content files so that the client media processor receives the plurality of media content files, and delivering the personalized content file to the client media processor to enable presentation of personalized content in accordance with the playlist. Other embodiments are disclosed.

20 Claims, 7 Drawing Sheets

(51) Int. Cl.
   *H04N 21/6543*   (2011.01)
   *H04N 21/258*    (2011.01)

(56) References Cited

U.S. PATENT DOCUMENTS

| | | |
|---|---|---|
| 8,104,059 B2 | 1/2012 | Noll et al. |
| 8,458,743 B2 | 6/2013 | Schmidt et al. |
| 8,634,704 B2 | 1/2014 | Johnston et al. |
| 8,650,192 B2 | 2/2014 | Biderman et al. |
| 8,676,987 B2 | 3/2014 | Lee |
| 8,677,439 B2 | 3/2014 | Sun et al. |
| 8,732,327 B2 | 5/2014 | Halén et al. |
| 2001/0025377 A1 | 9/2001 | Hinderks |
| 2006/0075428 A1 | 4/2006 | Farmer et al. |
| 2007/0283384 A1 | 12/2007 | Haeuser et al. |
| 2008/0141307 A1* | 6/2008 | Whitehead ............. H04N 7/173 725/46 |
| 2008/0155628 A1 | 6/2008 | Soukup et al. |
| 2008/0222689 A1 | 9/2008 | Howcroft et al. |
| 2008/0243924 A1 | 10/2008 | Barrett et al. |
| 2009/0106792 A1* | 4/2009 | Kan ................... H04N 7/17318 725/34 |
| 2009/0119702 A1 | 5/2009 | Jagannathan et al. |
| 2009/0158330 A1 | 6/2009 | Song et al. |
| 2011/0320287 A1 | 12/2011 | Holt et al. |
| 2012/0177038 A1* | 7/2012 | Dai ....................... H04L 12/184 370/390 |
| 2012/0259994 A1* | 10/2012 | Gillies ................ H04L 12/1881 709/231 |
| 2012/0320757 A1 | 12/2012 | Lohmar |
| 2013/0246567 A1* | 9/2013 | Green .................... H04L 67/06 709/217 |
| 2014/0282635 A1 | 9/2014 | DaCosta |
| 2014/0282772 A1* | 9/2014 | Chen ................ H04N 21/26258 725/97 |
| 2015/0074732 A1* | 3/2015 | Green ................ H04N 21/2668 725/93 |
| 2015/0149589 A1* | 5/2015 | Hao ....................... H04W 8/22 709/219 |
| 2015/0269629 A1* | 9/2015 | Lo ..................... G06Q 30/0269 705/14.66 |

\* cited by examiner

100

METHOD AND APPARATUS TO DELIVER A PERSONALIZED MEDIA EXPERIENCE

FIELD OF THE DISCLOSURE

The subject disclosure relates to a method and apparatus to deliver a personalized media experience, including personalized advertisements.

BACKGROUND

Video content is typically distributed using one of two mechanisms: progressive video and streamed video. Progressive video content is delivered as a series of files (or a playlist of files) that are fetched by a client from a server. This permits dynamic changes in video resolution and bandwidth, as well as insertion of custom advertisements and/or content. Streamed video can be delivered efficiently by multicasting.

BRIEF DESCRIPTION OF THE DRAWINGS

Reference will now be made to the accompanying drawings, which are not necessarily drawn to scale, and wherein.

DETAILED DESCRIPTION

Figure 1:
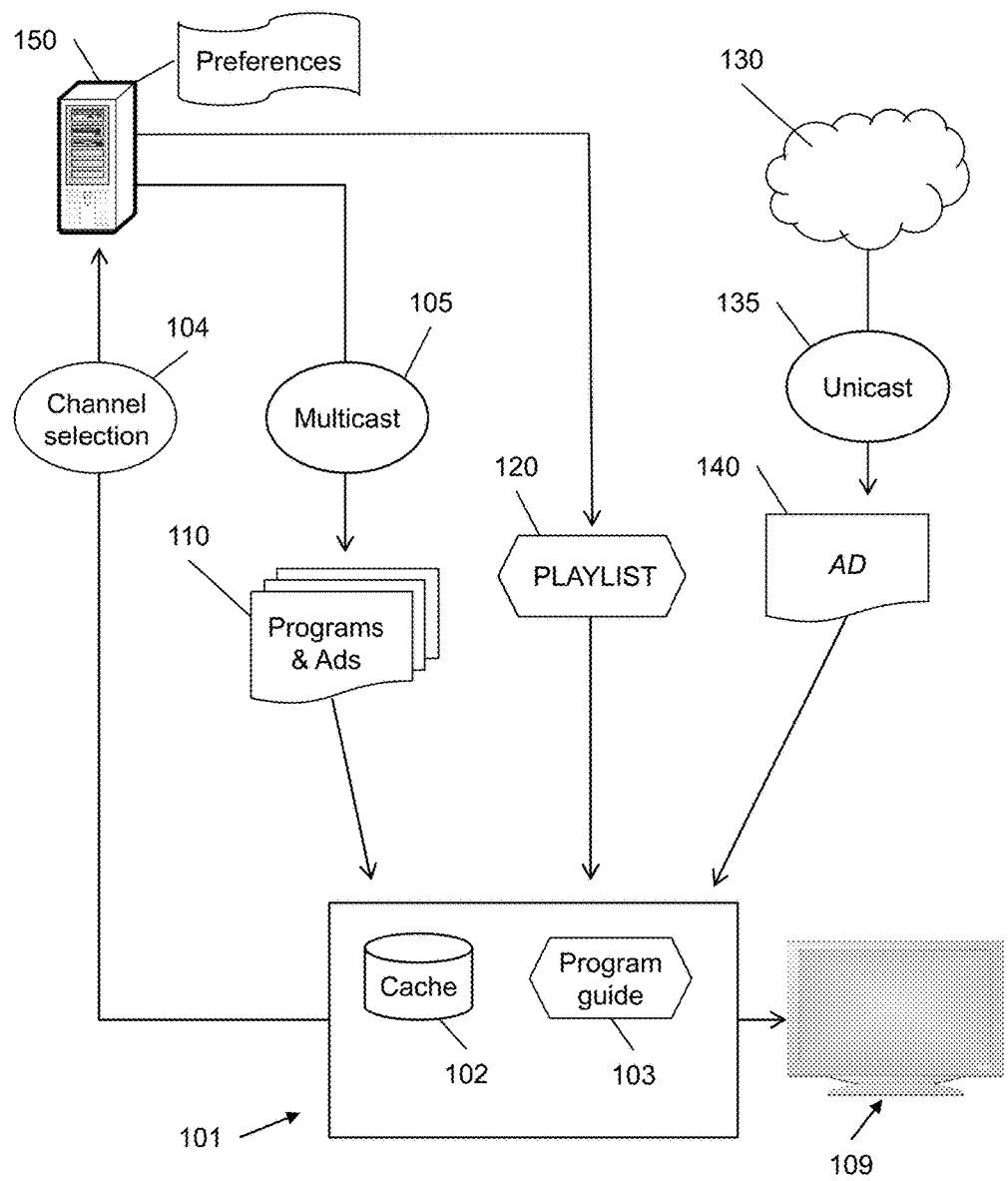
FIG. 1 schematically illustrates a system for providing video programs and advertisements including personalized advertisements, according to an embodiment of the disclosure.

The subject disclosure describes, among other things, illustrative embodiments for a hybrid multicast/unicast content distribution system that delivers content from a content provider to a client—for example, a set top box (STB)—in a series of files rather than a continuous MPEG transport stream. In an embodiment, a linear television viewing experience is provided that gains efficiency from multicast delivery, and is also enhanced with capability to insert personalized ads, recover from lost multicast frames, and allow channels to be changed quickly. Other embodiments are described in the subject disclosure.

One or more aspects of the subject disclosure include a playlist identifying a series of files, including program files and advertisements. The playlist can be personalized to the client, and accordingly include file identifiers for personalized advertisements. The playlist includes a locator (e.g. a uniform resource locator or URL) for each file. This permits the client to obtain content (e.g. targeted advertisements) as in a unicast environment.

One embodiment of the subject disclosure includes a server comprising a memory that stores instructions and a processor coupled to the memory. The processor, responsive to executing the instructions, performs operations. The operations comprise encoding media content to generate a plurality of media content files, each having a media content filename and a media content uniform resource locator. The operations also comprise providing a playlist for use by a client media processor; the playlist comprises a personalized content filename and a personalized content uniform resource locator for a personalized content file. The personalized content file is not included in the plurality of media content files. The operations further comprise multicasting the plurality of media content files so that the client media processor receives the plurality of media content files, and delivering the personalized content file for storage at the client media processor to enable presentation of personalized content in accordance with the playlist.

One embodiment of the subject disclosure includes a method comprising encoding, by a server comprising a processor, media content to generate a plurality of media content files, each having a media content filename and a media content uniform resource locator. The method also comprises receiving a channel request from a client media processor, and generating a playlist for use by the client media processor. The playlist is mapped to the requested channel, and the playlist includes a personalized content filename and a personalized content uniform resource locator for a personalized content file; the personalized content file is not included in the plurality of media content files. The method further comprises receiving a file request from the client media processor in accordance with the playlist, multicasting the plurality of media content files so that the client media processor receives the plurality of media content files, and delivering the personalized content file to the client media processor to enable presentation of personalized content in accordance with the playlist.

One embodiment of the subject disclosure includes a machine-readable storage device comprising instructions which, when executed by a processor, cause the processor to perform operations. The operations comprise encoding media content to generate a plurality of media content files, each having a media content filename and a media content uniform resource locator. The operations also comprise receiving a channel request from a client media processor, and mapping the channel to a playlist comprising a personalized content filename and a personalized uniform resource locator for a personalized content file. The personalized content file is not included in the plurality of media content files, and the playlist is limited to use by the client media processor and not by other media processors. The operations further comprise receiving a file request from the client media processor in accordance with the playlist, multicasting the plurality of media content files so that the client media processor receives the plurality of media content files, and unicasting the personalized content file to the client media processor to enable presentation of personalized content, in response to the file request.

FIG. 1 schematically illustrates a system 100 for providing video programs and advertisements including personalized advertisements, according to an embodiment of the disclosure. In this embodiment, a client executes on a media processor, depicted in FIG. 1 as a set top box (STB) 101. The STB includes a cache memory 102 and has a program guide 103. The STB 101 is coupled to a display device 109 for presenting video content (generally, programs and advertisements) to the user. In an embodiment, the user can select a program from the program guide to be presented on display device 109. In another embodiment, the user selects a channel over which programs and advertisements are transmitted; the channel selection 105 is communicated to a service provider 150.

The selected channel is mapped to a playlist 120 that identifies files containing the program and advertising content for that channel. In this embodiment, the STB 101 fetches the playlist from the content provider. In another embodiment, the program guide 103 (which has a list of all programs on all available channels) includes a URL specifying a location from which the playlist can be retrieved.

In this embodiment, the playlist 120 identifies a series of files to be fetched by the client, e.g. from cache 102. The files contain MPEG encoding of program and advertising content for the channel and also specific to the user (according to user preferences accessible by server 150). Each file includes a locator, such as a URL, so that the client can obtain the file if it is not automatically provided. In an embodiment, content files 110 with programs and advertising not personalized to the user (that is, default advertising) is delivered to the client in a multicast 105, while files for a personalized advertisement 140 are obtained via network 130 in a unicast 135.

Figure 2:
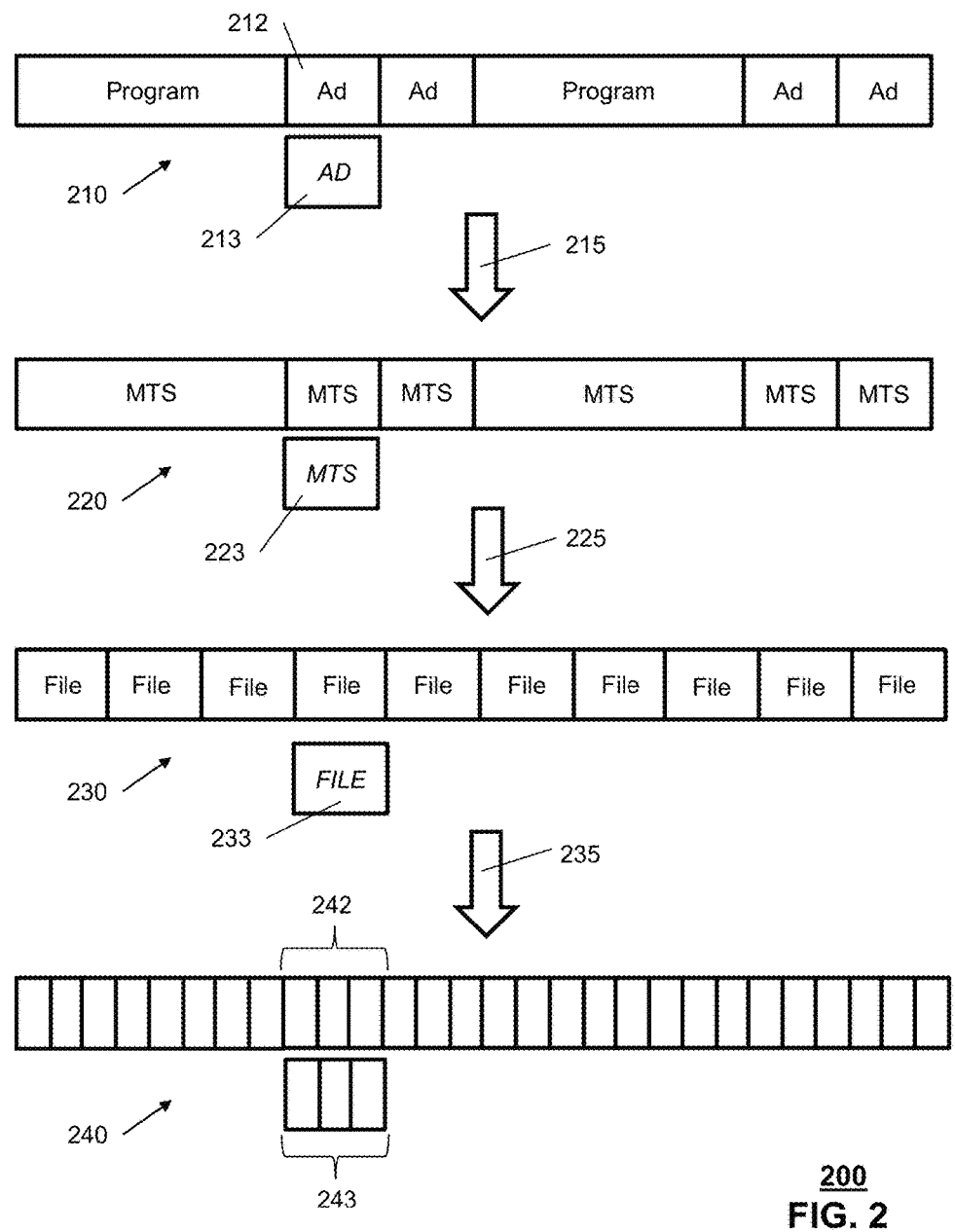
FIG. 2 schematically illustrates file encoding and multicast delivery of video content, according to an embodiment of the disclosure.

FIG. 2 schematically illustrates a process 200 for encoding and delivering program and advertising content, in accordance with an embodiment of the disclosure. An MPEG encoding process 215 is performed on a sequence 210 of program and ad content, generating a set 220 of MPEG transport streams (MTS) corresponding to the separate items of content in sequence 210. In this example, a personalized advertisement 213 is to be presented to the user in place of default advertisement 212. Advertisement 213 is also encoded to generate an MTS 223.

It will be appreciated that the content sequence 210 is not encoded into a single transport stream (as in multicast linear video), but instead is encoded into a plurality of different MTS, so that program and advertising content remain differentiated (that is, program semantics are preserved).

The MTS sequence 220 is then converted by process 225 into a series 230 of files. The files are intentionally aligned with program semantics. The concatenated files contain MPEG encoding that is identical to an MPEG transport stream encoded from sequence 210 in a multicast linear video environment. In addition, the MTS 223 representing the personalized advertisement is converted into file 233.

The client executing on the STB 101 can then request the files from the service provider, in accordance with the playlist 120. In an embodiment, the service provider responds to the request by joining the client to a multicast group, to deliver the program files and default advertising files by multicasting 235 to all viewers of the channel. The program content and default advertisements are delivered as multicast packet frames 240; in an embodiment, the frames are multicast as IP packets.

In this example, the playlist 120 does not include advertisement 212, but instead includes advertisement 213. The file 233 for this advertisement is not included in the multicast, but is converted into packets 243 so that it can be delivered by unicast. The client then presents packets 243 at display device 109 in place of packets 242 that correspond to the default advertisement 212.

In an embodiment, multiple users may have the same specific advertisement 213 on their playlists. In this situation, packets 243 can be distributed to those users by multicast.

In an embodiment, file 233 may be pre-positioned in the cache 102 of the client STB, so that it need not be sent in real time. More generally, the files 230 (multicast as packet frames 240) can be sent to the client for storage in the cache 102 in advance of a playlist request. In this embodiment, the client can retrieve successive files (corresponding to program sequence 210 for the channel) from the cache, or alternatively from the unicast network 130. This provides a reliability mechanism in case of packets lost from the multicast streams. If a file is not delivered to the cache because of a dropped packet, then the client misses the cache and requests that the file to be delivered using unicast. Similarly, in this embodiment, the client may fail to retrieve a file corresponding to a personalized advertisement from the cache; the client can use the URL associated with that file to obtain the advertising content via a network.

Figure 3:
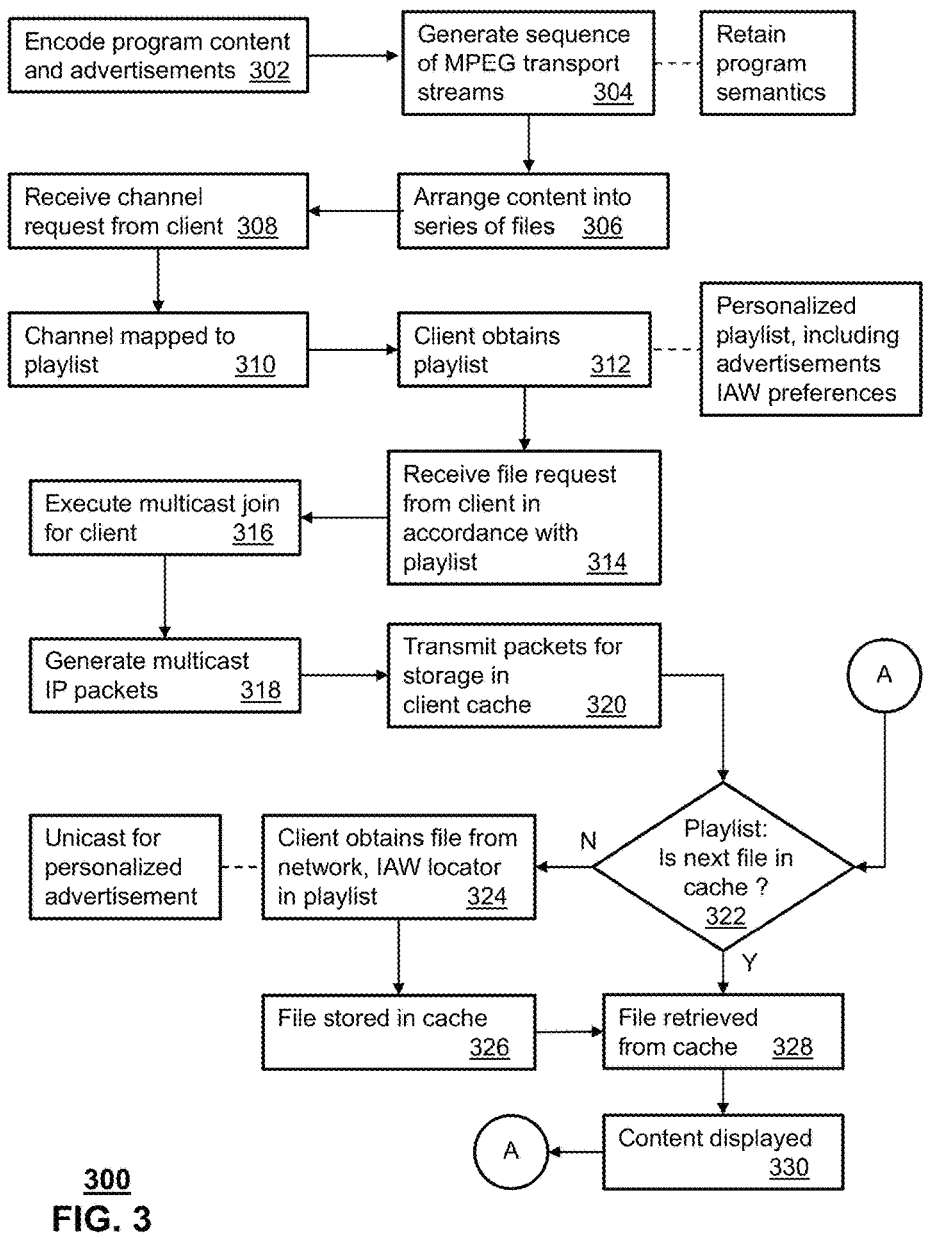
FIG. 3 depicts an illustrative embodiment of a method used in portions of the system described in FIG. 1.

FIG. 3 shows a flowchart of a method 300 for delivering program content and personalized content (including advertisements), in accordance with an embodiment of the disclosure. In step 302, the program content is encoded, along with default advertisements. The encoded content is generated as a plurality of distinct MPEG transport streams (step 304) so that programs and advertisements, and their sequence, remain distinguishable—that is, program semantics are retained. The program and advertising content, represented as MPEG transport streams (MTS), is arranged as a series of files intentionally aligned with the program semantics (step 306). In this embodiment, a channel selection is received from a client executing on a STB (step 308); alternatively, a specific program may the selected by the client from a program guide accessible by the STB.

The channel is mapped to a playlist that identifies a series of files to be retrieved for presentation at the client display device (step 310). Those files, when concatenated, contain the MPEG encoding identical to the MPEG transport stream in a multicast linear video environment—but specific to the client requesting the channel. Different clients may receive different playlists which contain different advertisements for what is otherwise the same program material; in this embodiment, clients requesting a given channel all have the same files for program material on their playlists (common program files for that channel).

In this embodiment, the program guide includes a locator (e.g. a URL) indicating a location from which the personalized playlist can be retrieved. The client obtains the playlist (step 312) and follows the playlist to request files from the service provider. The service provider receives the request (step 314) and recognizes the request by instructing that client to join a multicast group (step 316) which is used to deliver the common program files to all STBs where the channel has been requested. The common program files (as well as files representing default advertisements) are delivered using multicast frames and are sent once to all of the STBs requesting the channel (step 318). Personalized advertisements are embodied in files delivering different content to different clients. Those files may be delivered using unicast, or multicast if they are modest in number, or may be pre-positioned in the client (e.g. STB) cache so that they need not be delivered in real time.

In this embodiment, the files for the program material are transmitted to the requesting clients in advance of their scheduled display (step 320) and stored in local cache at the respective STBs, so that a client can find the next file in their playlist to be in the local cache when needed. If the file is found in the cache (step 322), it is retrieved from the cache (step 328) for display at the display device (step 330).

If the required file is not found in the cache, the client uses the file locator (e.g. URL) in the playlist to retrieve the file via the network (step 324). This can occur when the next file in the playlist is a personalized advertisement and thus not included in the multicast. In addition, a multicast file might not be delivered to the cache because of a dropped packet (this is referred to as a "cache miss"). In either of these situations, the client can request the required file to be delivered to the cache using unicast (step 326). This procedure thus provides an additional reliability mechanism for packets that may be lost from the multicast streams (for example, when the client misses packets belonging to the first file after joining the multicast group).

It will be appreciated that this method can also revert to progressive streaming for networks that cannot support multicast. Accordingly, a single type of video client (e.g. STB) may be used in both multicast and unicast systems.

Figure 4:
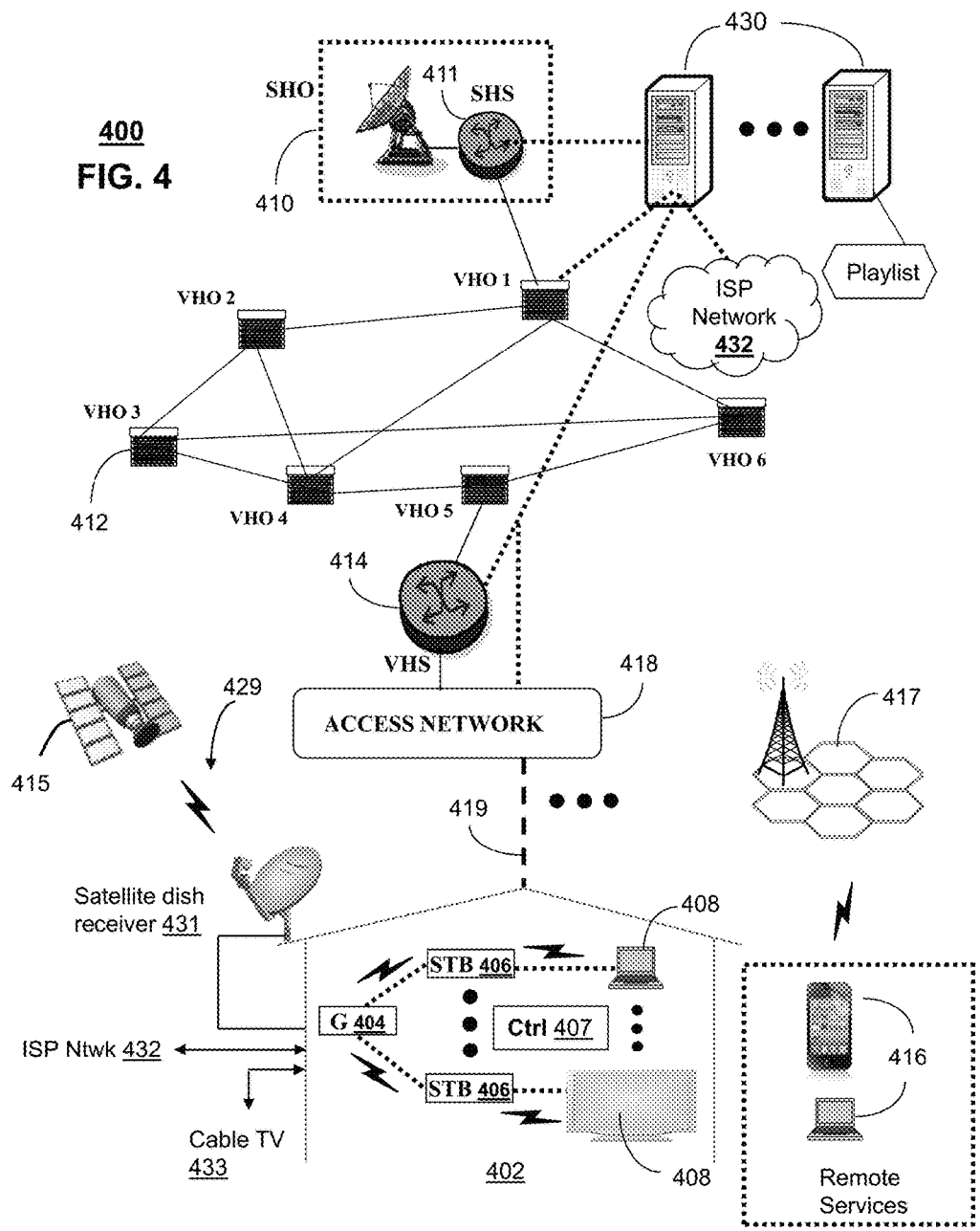
FIGS. 4-5 depict illustrative embodiments of communication systems that can provide media services using video content distribution as shown in FIGS. 1-3.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. For instance, one or more devices illustrated in the communication system 400 of FIG. 4 can operate as a server comprising a memory that stores instructions and a processor coupled to the memory, in which the processor, responsive to executing the instructions, performs operations. The operations comprise encoding media content to generate a plurality of media content files, each having a media content filename and a media content uniform resource locator. The operations also comprise providing a playlist for use by a client media processor; the playlist comprises a personalized content filename and a personalized content uniform resource locator for a personalized content file. The personalized content file is not included in the plurality of media content files. The operations further comprise multicasting the plurality of media content files so that the client media processor receives the plurality of media content files, and delivering the personalized content file for storage at the client media processor to enable presentation of personalized content in accordance with the playlist.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless LAN (WiFi™), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above. In an embodiment, the satellite broadcast system can be used to efficiently distribute the multicast groups by associating the multicast packets with a channel that is received over the air (OTA). In this instance, a multicast join process would be replaced with a tuner channel change.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a media content server (herein referred to as server 430). The server 430 can use computing and communication technology to deliver program content and advertising content including personalized advertisements, which can include among other things, multicasting the program content and unicasting the personalized advertisements. For instance, multicasting and unicasting by server 430 can be similar to the functions described above with reference to FIGS. 2 and 3. The media processors 406 and wireless communication devices 416 can be provisioned with software functions to utilize the services of server 430. For instance, the functions of media processors 406 and wireless communication devices 416 can be similar to the functions of media processor 101 described above with reference to FIG. 1.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
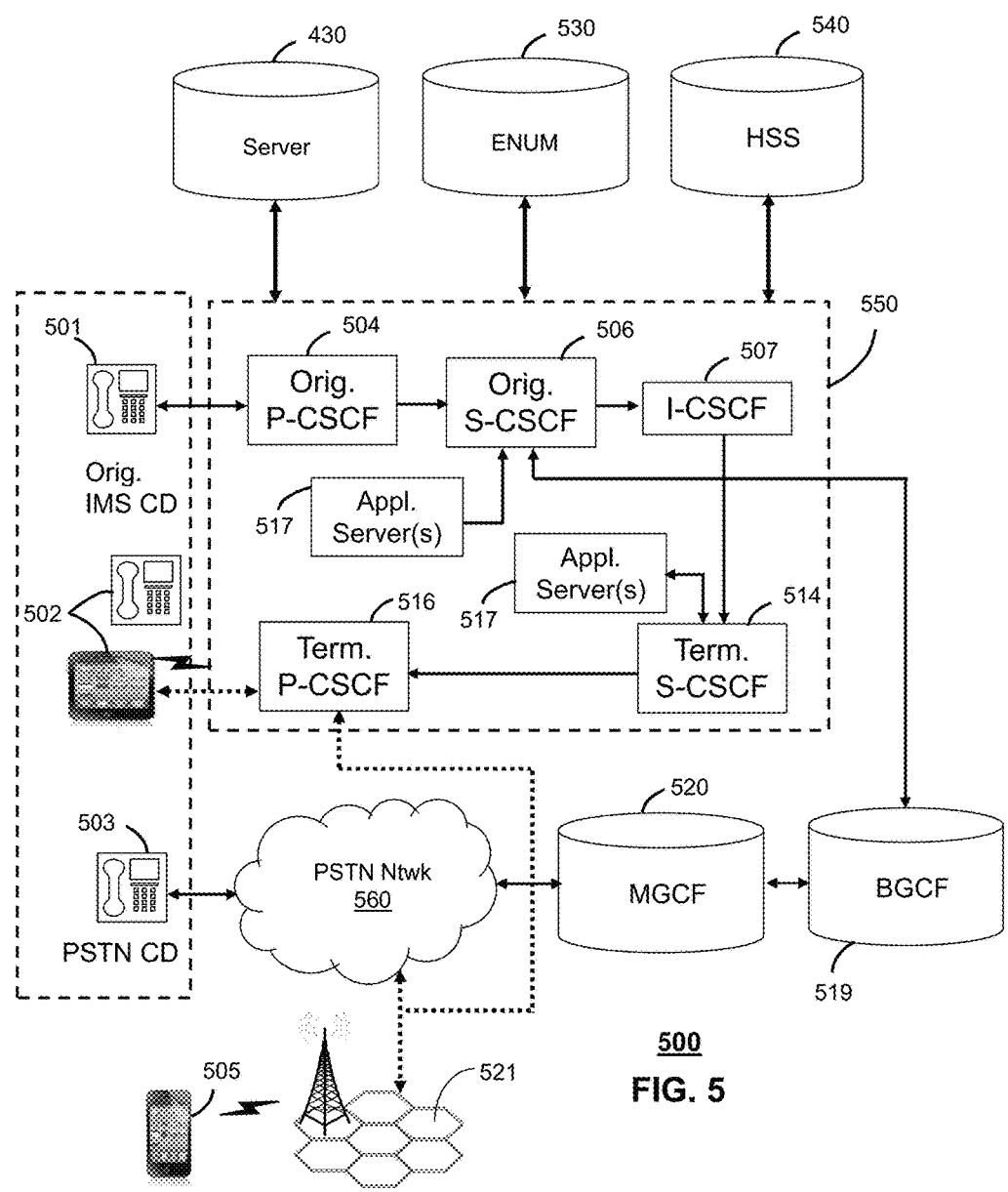

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. In particular, system 500 can perform a method comprising encoding, by a server comprising a processor, media content to generate a plurality of media content files, each having a media content filename and a media content uniform resource locator. The method also comprises receiving a channel request from a client media processor, and generating a playlist for use by the client media processor. The playlist is mapped to the requested channel, and the playlist includes a personalized content filename and a personalized content uniform resource locator for a personalized content file; the personalized content file is not included in the plurality of media content files. The method further comprises receiving a file request from the client media processor in accordance with the playlist, multicasting the plurality of media content files so that the client media processor receives the plurality of media content files, and delivering the personalized content file to the client media processor to enable presentation of personalized content in accordance with the playlist.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to communication system 500 for purposes similar to those described above. Server 430 can provide services to the CDs 501, 502, 503 and 505 of FIG. 5, which can be adapted with software to utilize the services of the server 430. Server 430 can be an integral part of the application server(s) 517, which can be adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
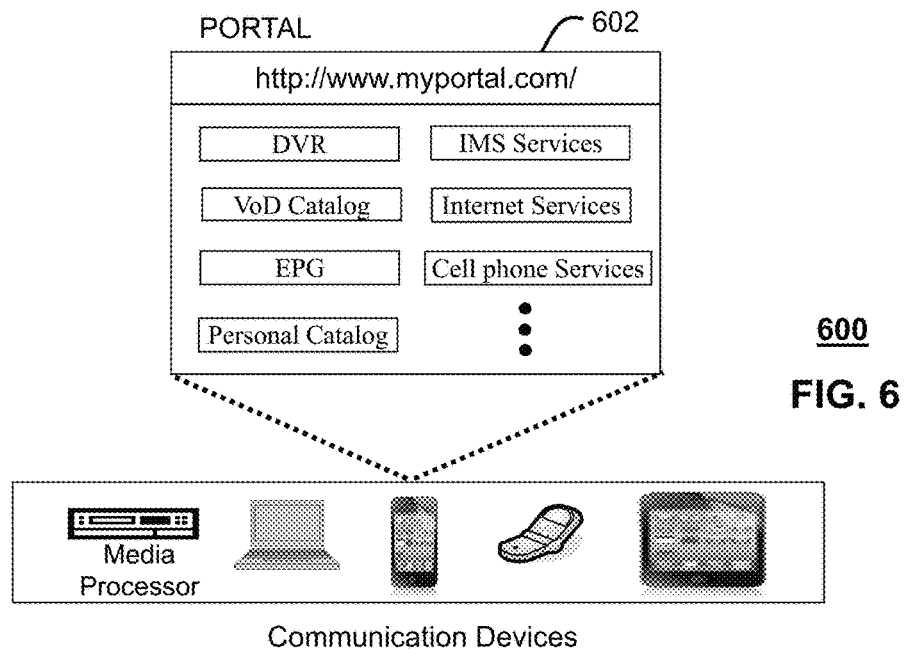
FIG. 6 depicts an illustrative embodiment of a web portal for interacting with the communication systems of FIGS. 4-5.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100, communication system 400, and/or communication system 500. The web portal 602 can be used for managing services of system 100 and communication systems 400-500. A web page of the web portal 602 can be accessed by a Uniform Resource Locator (URL) with an Internet browser using an Internet-capable communication device such as those described in FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications to adapt these applications as may be desired by subscribers and/or service providers of system 100 and communication systems 400-500. For instance, users of services provided by server 150 or server 430 can log into their online accounts and provision the server 150 or server 430 with features such as user profiles, provide contact information to the server to enable it to communicate with devices described in FIGS. 1, 4 and 5, and so on. Service providers can log onto an administrator account to provision, monitor and/or maintain system 100 of FIG. 1 or server 430.

Figure 7:
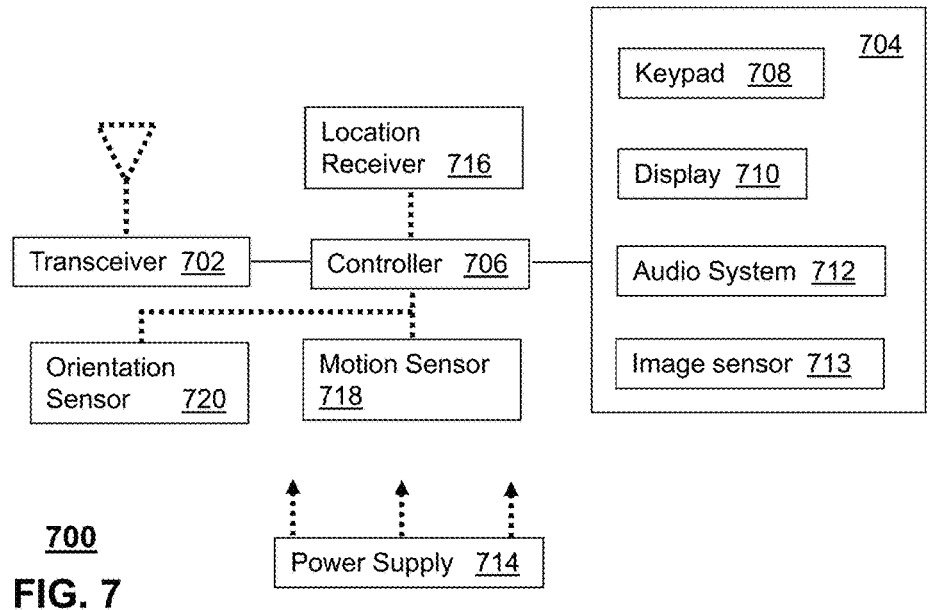
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1 and FIGS. 4-5, and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system 100 of FIG. 1 and communication systems 400-500 of FIGS. 4-5, such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
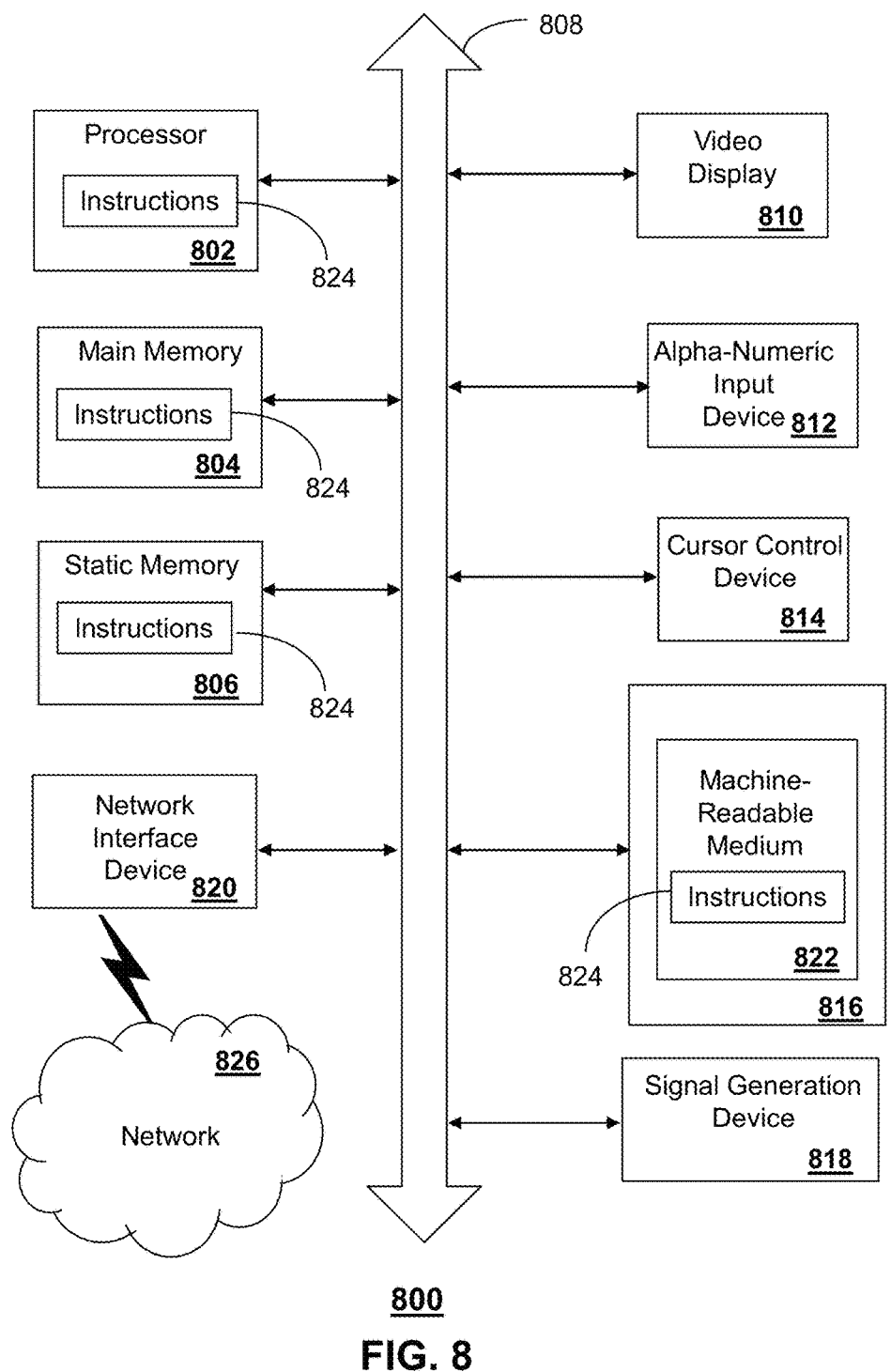
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 150 and STB 101 of FIG. 1, and other devices of FIGS. 4-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
   a processing system including a processor; and
   a memory that stores executable instructions that, when executed by the processing system, facilitate performance of operations, comprising:
   encoding media content to generate a plurality of media content files, each having a media content filename and a media content uniform resource locator;
   identifying a default content file among the plurality of media content files;
   determining a personalized content file, wherein the personalized content file is to replace the default content file when the plurality of media content files are presented by a client media processor;
   providing a playlist for use by the client media processor, wherein the playlist comprises a filename for each of the plurality of media content files, a personalized content filename and a personalized content uniform resource locator for the personalized content file, wherein the personalized content file not included in the plurality of media content files;
   multicasting the plurality of media content files to a first group of media processors, including the client media processor, in response to receiving a first request for the plurality of media content files from each of the first group of media processors, wherein the client media processor receives the plurality of media content files;
   multicasting the personalized content file to a second group of media processors including the client media processor for storage at the client media processor to enable presentation of personalized content in accordance with the playlist, wherein the multicasting of the personalized content file is in response to receiving a second request for the personalized content file from each of the second group of media processors;
   receiving a third request from the client media processor for the personalized content file during a presentation of a media content file from among the plurality of media content files, wherein the third request is generated responsive to the client media processor detecting the personalized content file is not stored in a cache storage of the client media processor; and
   re-delivering the personalized content file to the client media processor resulting in a redelivered personalized content file, wherein the client media processor stores the personalized content file in the cache storage responsive to receiving the personalized content file from the redelivering of the personalized content file.

2. The server of claim 1, wherein the playlist is limited to use by the client media processor and not by other media processors.

3. The server of claim 2, wherein the operations further comprise: obtaining data regarding preferences of a user of the client media processor;
   and generating a user profile in accordance with the preferences, wherein the playlist is provided in accordance with the user profile.

4. The server of claim 1, wherein the operations further comprise: receiving a channel request from the client media processor;
   And in response to the channel request, facilitating a multicast join procedure to initiate the multicasting with respect to the client media processor and the first group of media processors.

5. The server of claim 4, wherein the operations further comprise mapping the requested channel to the playlist, the playlist accordingly including information regarding program content of the channel, default advertising of the channel, and the personalized content file.

6. The server of claim 1, wherein the encoding comprises MPEG encoding, and wherein each of the plurality of media content files corresponds to a distinct MPEG transport stream.

7. The server of claim 6, wherein each MPEG transport stream corresponds to a program or an advertisement of the media content.

8. The server of claim 1, wherein the playlist comprises a plurality of playlist filenames and playlist uniform resource locators corresponding to files specified for presentation at the client media processor, the plurality of playlist filenames including the media content filename and the personalized content filename.

9. The server of claim 1, wherein the receiving of the second request is in response to the client media processor detecting that the personalized content file is scheduled to be presented according to the playlist.

10. The server of claim 1, wherein the re-delivered personalized content file is received by the client media processor prior to a scheduled presentation of the re-delivered personalized content file according to the playlist.

11. A method comprising:
  encoding, by a server including a processor, media content to generate a plurality of media content files, each having a media content filename and a media content uniform resource locator;
  identifying a default content file among the plurality of media content files;
  determining a personalized content file, wherein the personalized content file is to replace the default content file when the plurality of media content files are presented by a client media processor;
  receiving, by the server, a channel request from the client media processor;
  generating, by the server, a playlist for use by the client media processor, wherein the playlist is mapped to the requested channel, and wherein the playlist comprises a filename for each of the plurality of media content files, a personalized content filename and a personalized content uniform resource locator for the personalized content file, the personalized content file not included in the plurality of media content files;
  receiving, by the server, a file request for the plurality of media content files from the client media processor in accordance with the playlist;
  multicasting, by the server, the plurality of media content files to a first group of media processors, including the client media processor, in response to receiving the file request for the plurality of media content files from each of the first group of media processors, wherein the client media processor receives the plurality of media content files;
  multicasting, by the server, the personalized content file to a second group of media processors including the client media processor to enable presentation of personalized content in accordance with the playlist, wherein the multicasting of the personalized content file is in response to receiving a first request for the personalized content file from each of the second group of media processors;
  receiving a second request from the client media processor for the personalized content file during a presentation of a media content file from among the plurality of media content files, wherein the second request is generated responsive to the client media processor detecting the personalized content file is not stored in a cache storage of the client media processor; and
  re-delivering the personalized content file to the client media processor resulting in a sent personalized content file, wherein the client media processor stores the personalized content file in the cache storage responsive to receiving the personalized content file from the re-delivering of the personalized content file.

12. The method of claim 11, wherein the multicasting further comprises invoking a multicast join procedure to initiate the multicasting to the first group of media processors in response to the channel request.

13. The method of claim 11, wherein the encoding further comprises MPEG encoding, and wherein each file of the plurality of media content files corresponds to a distinct MPEG transport stream.

14. The method of claim 13, wherein the plurality of media content files is aligned with program semantics of the media content, each MPEG transport stream accordingly representing a program of the media content or an advertisement of the media content.

15. The method of claim 11, further comprising: obtaining, by the server, data regarding preferences of a user of the client media processor; and generating, by the server, a user profile in accordance with the preferences, wherein the playlist is generated for the user in accordance with the user profile.

16. A machine-readable storage device comprising executable instructions that, when executed by a processing system including a processor, facilitate performance of operations comprising:
  encoding media content to generate a plurality of media content files, each having a media content filename and a media content uniform resource locator;
  identifying a default content file among the plurality of media content files;
  determining a personalized content file, wherein the personalized content file is to replace the default content file when the plurality of media content files are presented by a client media processor;
  receiving a channel request from the client media processor;
  mapping the channel to a playlist comprising a filename for each of the plurality of media content files, a personalized content filename and a personalized uniform resource locator for the personalized content file, wherein the personalized content file is not included in the plurality of media content files, wherein the playlist is limited to use by the client media processor and not by other media processors;
  receiving a file request for the plurality of media content files from the client media processor in accordance with the playlist;
  multicasting the plurality of media content files to a first group of media processors, including the client media processor, in response to receiving the file request for the plurality of media content files from each of the first group of media processors, whereby the client media processor receives the plurality of media content files;
  multicasting the personalized content file to a second group of media processors including the client media processor to enable presentation of personalized content, in response to the file request, wherein the multicasting of the personalized content file is in response to receiving a first request for the personalized content file from each of the second group of media processors;
  receiving a second request from the client media processor for the personalized content file during a presentation of a media content file from among the plurality of media content files, wherein the second request is generated responsive to the client media processor detecting the personalized content file is not stored in a cache storage of the client media processor; and
  unicasting the personalized content file to the client media processor, wherein the client media processor stores the personalized content file in the cache storage responsive to receiving the personalized content file from the unicasting of the personalized content file.

17. The machine-readable storage device of claim 16, wherein the plurality of media content files are stored in the cache storage of the client media processor.

18. The machine-readable storage device of claim 16, wherein the multicasting further comprises invoking a multicast join procedure to initiate the multicasting to the first group of media processors in response to the channel request.

19. The machine-readable storage device of claim 16, wherein the encoding further comprises MPEG encoding, and wherein each of the plurality of media content files corresponds to a distinct MPEG transport stream.

20. The machine-readable storage device of claim 16, wherein the operations further comprise:
  obtaining data regarding preferences of a user of the client media processor;
  and generating a user profile in accordance with the preferences, wherein information in the playlist regarding the personalized content file is generated in accordance with the user profile.

* * * * *